Feb. 23, 1960  W. J. CASEY III  2,925,925
TRANSITION COUPLING
Filed May 19, 1958
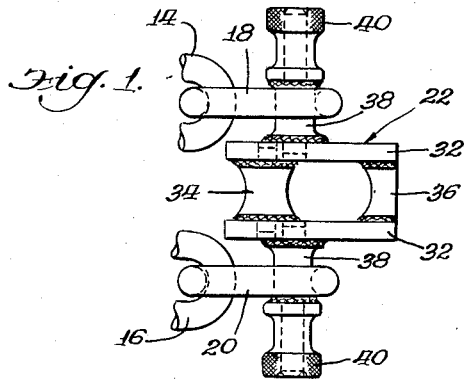
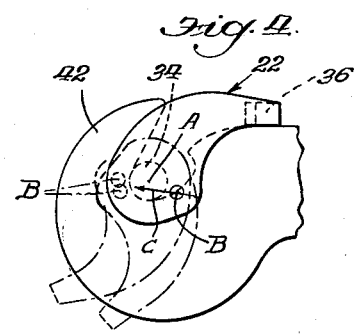
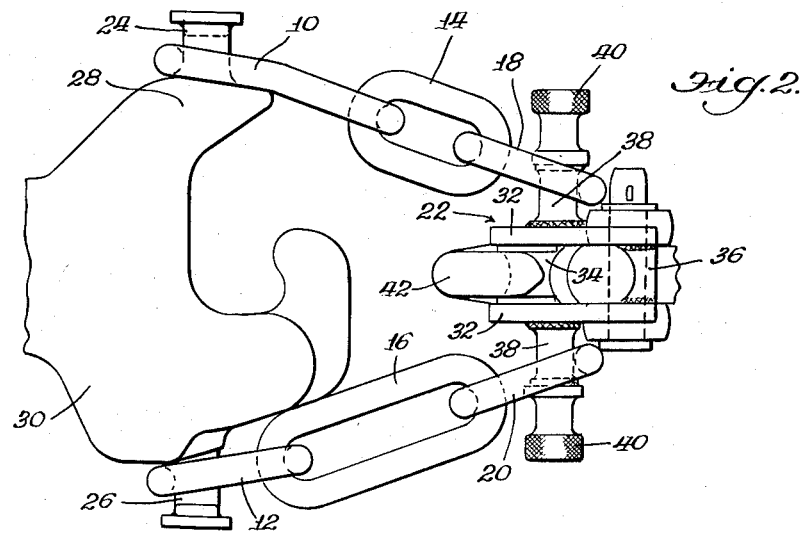
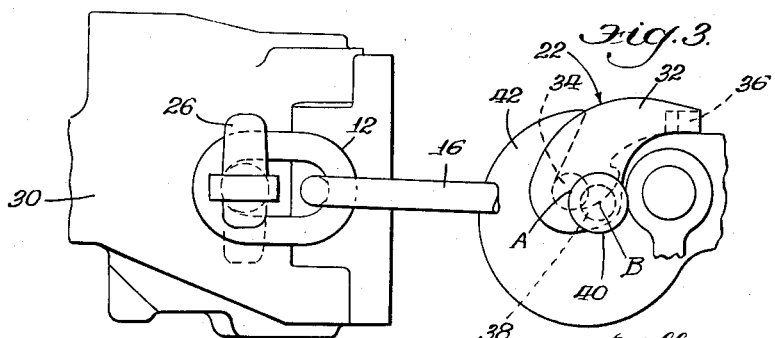
INVENTOR.
William J. Casey, III.
BY Walter L. Schlegel, Jr.
Witness:
Ralph M. Faust
Atty.

Patented Feb. 23, 1960

2,925,925

TRANSITION COUPLING

William J. Casey III, Highland Park, Ill., assignor to American Steel Foundries, Chicago, Ill., a corporation of New Jersey Application May 19, 1958, Serial No. 736,325

3 Claims. (Cl. 213—112)

This invention relates to coupling arrangements and more particularly to a transition coupling device for railway vehicles.

In many foreign countries it has been customary to couple railway cars by means of a manually operated hook arrangement. Steps have been taken, however, toward the adoption of a standard automatic coupler such as is commonly used in the United States. Because such a modernization program requires a considerable amount of time for completion, there must of necessity be provided a transition coupler arrangement for coupling the modernized cars to those not yet provided with the automatic couplers.

Many types of transition coupling devices have been utilized but most have not been completely satisfactory from a safety standpoint nor in the matter of convenience of operation.

The primary object therefore of the present invention is the provision of a transition coupling device adapted to be applied to an automatic coupler and accommodating cooperation with other automatic couplers or with hook type couplers.

Another object of the invention is the provision of a transition coupling device which is completely out of the way when in the inoperative position.

A specific object of the invention is the provision of a transition coupling device incorporating a simple slack take-up arrangement which can be quickly and easily applied and released.

Still another object of the invention is the provision of such a device which cannot accidently become detached in service.

An important object of the invention is the provision of such a device which can be placed into operative position and adjusted for minimum slack without the necessity of the operator reaching between the couplers on the railway cars.

These and other objects will be apparent from the following description and accompanying drawings, wherein:

Figure 1 is a fragmentary top plan view of the preferred embodiment of the transition coupling device;

Figure 2 is a top plan view of the device of Figure 1 shown interconnecting an automatic type coupler and a hook type coupler, the couplers being only fragmentarily illustrated;

Figure 3 is a fragmentary side elevational view of the novel transition coupling device received in a hook coupler, and Figure 4 is a fragmentary schematic view of the take-up link of the transition coupling device illustrating the locked and unlocked positions thereof.

Referring to the drawings and particularly to Figure 2, it is seen that the preferred form of the transition coupling device comprises a chain having a pair of rear links 10 and 12, a pair of center links 14 and 16, a pair of forward links 18 and 20 and a slack take-up link indicated generally at 22. The rear links 10 and 12 are received over lugs 24 and 26, respectively, the lug 24 being welded to or formed integrally with the guard arm 28 of an automatic coupler 30 and lug 26 being welded to or formed integrally with the coupler 30 directly opposite lug 24. Link 10 is relatively long, compared to the distance from lug 24 to the forward end of guard arm 28, to permit link 14 to clear the guard arm when the chain is raised from inoperative position to the position shown in Figure 2. Link 10 is also preferably bent a small amount to provide engagement, under a pulling load, along a substantial portion of the outer surface of guard arm 28. End link 12, on the other hand, is relatively short, compared to the distance from lug 26 to the bottom of the coupler as seen in Figure 3, to prevent link 16 from catching under the coupler as the chain is raised from inoperative to operative position. The difference in length between links 10 and 12 is compensated for in the center links 14 and 16 as best seen in Figure 2.

The take-up link 22, which may be a cast structure, is illustrated herein as a welded structure comprising a pair of spaced support plates 32 (Figures 1 and 2), connected by a hook trunnion 34 which is adapted to be received over a hook coupler 42. Also interconnecting the links 32 at the end thereof opposite the hook trunnion is a tie bar 36 which serves the dual purpose of giving rigidity to the structure and also acting as a stop means to limit clockwise rotation (as viewed in Figures 3 and 4) of link 22.

Extending outward laterally of the plates 32 are a pair of chain trunnions 38 arranged to receive therearound the links 18 and 20 as seen in Figures 1 and 2. The center line B (Figure 3) of the chain trunnions is disposed between the center line A of the hook trunnion and the tie bar 36. Furthermore, the center line B, when the link 22 is in slack take-up position, as will be explained hereinafter, must be disposed vertically in such a manner that the line of action of the pulling force on the coupling links always passes below the center line A.

Formed integrally with or welded to the chain trunnions 38 are laterally extending knurled handles 40. Referring particularly to Figure 2, it is apparent that by utilizing the handles 40 the transition coupling can be manipulated by hand to operative or inoperative position, and also to slack take-up position, without the necessity of the operator at any time placing his hands between the car couplers 30 and 42.

The manner of operation of take-up link 22 is more clearly seen in Figure 4 which shows schematically only the hook coupler 42 and the take-up link 22 with portions thereof removed for clarity. Referring to this, it is seen that the take-up link acts in the manner of a toggle rotatable on the center line A of trunnion 34. When the link is rotated in a counter-clockwise direction to the release position shown by the phantom lines, the center line B of the hook trunnion is positioned to the left or toward the automatic coupler thereby providing slack in the interconnecting chains. When a pulling force is exerted and the link moves to the left hand phantom position, there is still no possibility of the link becoming detached from the hook coupler 42 and the device still acts to transmit the pulling force between the couplers. However, when the connecting link 22 is in the release position and a buffing action occurs between the couplers, the link 22, because of its own weight and the weight of the chain links, swings to the lower of the two positions shown in phantom and is therefore completely clear of the buffing couplers.

In order to take up slack in the transition coupling device, link 22 is rotated in a clockwise direction by means of the handles 40 to the position shown by the solid lines in Figure 4, at which time the center line B is positioned to the right and also below center line A.

The tie bar 36 at this time acts as a stop to limit the clockwise rotational movement of link 22. The relationship between center lines A and B and stop 36 must be such that the line of action of pulling force on the chain always is below center line A. A typical line of action in extreme relative vertical displacement of the couplers is illustrated by the arrow C.

When the link 22 is in the slack take-up position, it is seen that its weight tends to urge the link in a clockwise direction and it is also apparent that any pulling force exerted on the chain also tends to urge the link in a clockwise direction. Therefore, the device is effectively locked in the slack take-up position until manually moved therefrom by an operator.

I claim:

1. A transition coupling device for interconnecting an automatic coupler nd a hook coupler, said device comprising: a take-up link; a pair of chains comprising a plurality of links connecting said take-up link to either side of said automatic coupler; said take-up link comprising a hook trunnion receivable in the hook coupler; co-axial chain trunnions extending outward laterally of said hook trunnion and having a center line eccentric to the center line of said hook trunnion; said take-up link being rotatable about the center line of the hook trunnion in a direction to move the chain trunnions toward the automatic coupler to provide slack in said chains; said take-up link being rotatable in the opposite direction to move the chain trunnions away from the automatic coupler for removing slack from said chains; and handle means disposed outwardly of said chain trunnions for manually operating said device.

2. A transition coupling device for interconnecting an automatic coupler and a hook coupler, said device comprising: a take-up link; a pair of chains comprising a plurality of links connecting said take-up link to either side of said automatic coupler; said take-up link comprising a hook trunnion receivable in the hook coupler; co-axial chain trunnions extending outward laterally of said hook trunnion and having a center line eccentric to the center line of said hook trunnion; said take-up link being rotatable about the center line of the hook trunnion in a direction to move the chain trunnions toward the automatic coupler to provide slack in said chains; said take-up link being rotatable in the opposite direction to move the chain trunnions away from the automatic coupler for removing slack from said chains; the rotation in said opposite direction being of such an amount that the line of action of the pulling force through said chains passes below the center line of said hook trunnion; and handle means outwardly of said chain trunnion for manually operating said device.

3. A transition coupler for interconnecting an automatic coupler and a hook type coupler, said device comprising: a take-up link; a pair of chains each comprising a plurality of links connecting the take-up link to opposite sides of the automatic coupler; said take-up link comprising spaced support plates, a hook trunnion interconnecting said plates at one end thereof and receivable over the hook coupler, a stop bar interconnecting said plates at the opposite ends thereof, co-axial chain trunnions extending laterally from said plates, the axis of said chain trunnions being off-set from and substantially parallel to the axis of said hook trunnion, and handle means for rotating said take-up link about the hook trunnion axis in one direction to move the chain trunnions toward the automatic coupler to provide slack in said pair of chains and in the opposite direction to move the chain trunnions away from the automatic coupler for removing slack from said pair of chains, said handle means being disposed laterally outward of said pair of chains on opposite sides of said take-up link.

References Cited in the file of this patent

UNITED STATES PATENTS

| | | |
|---|---|---|
| 1,202,849 | Janney et al. | Oct. 31, 1916 |
| 1,807,243 | Kahler | May 26, 1931 |